US008966613B2

(12) United States Patent
Horvitz et al.

(10) Patent No.: US 8,966,613 B2
(45) Date of Patent: Feb. 24, 2015

(54) MULTI-FRAME DEPTH IMAGE INFORMATION IDENTIFICATION

(75) Inventors: Eric Horvitz, Kirkland, WA (US); Desney S. Tan, Kirkland, WA (US); James Chia-Ming Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/250,542

(22) Filed: Sep. 30, 2011

(65) Prior Publication Data

US 2013/0086674 A1 Apr. 4, 2013

(51) Int. Cl.
G06F 21/00 (2013.01)
H04L 9/32 (2006.01)
G06F 21/32 (2013.01)
H04L 29/06 (2006.01)

(52) U.S. Cl.
CPC .............. *H04L 9/3231* (2013.01); *G06F 21/32* (2013.01); *H04L 63/0861* (2013.01)
USPC .......................................................... 726/17

(58) Field of Classification Search
None
See application file for complete search history.

(56) References Cited

U.S. PATENT DOCUMENTS

| 6,301,370 | B1 | 10/2001 | Steffens et al. |
| 7,177,450 | B2 | 2/2007 | Tajima |
| 7,620,217 | B2 | 11/2009 | Chen et al. |
| 2006/0224882 | A1* | 10/2006 | Chin ............................ 713/150 |
| 2008/0170776 | A1* | 7/2008 | Albertson et al. ............ 382/154 |
| 2009/0061819 | A1* | 3/2009 | Coughlan et al. ............. 455/410 |
| 2010/0205667 | A1* | 8/2010 | Anderson et al. ............... 726/19 |

OTHER PUBLICATIONS

Cohen, et al., "Expression Recognition from Video Sequences: Temporal and Static Modeling", In Computer Vision and Image Understanding, vol. 91, Issues 1-2, Jul.-Aug. 2003, 28 pages.
Essa, et al., "Facial Expression Recognition using a Dynamic Model and Motion Energy", In Proceedings of the Fifth International Conference on Computer Vision, Jun. 20-23, 1995, 8 pages.
Park, et al., "3D Model-Assisted Face Recognition in Video", In Proceedings of the 2nd Canadian conference on Computer and Robot Vision, May 9-11, 2005, 8 pages.

(Continued)

*Primary Examiner* — Samson Lemma
*Assistant Examiner* — Malcolm Cribbs
(74) *Attorney, Agent, or Firm* — Aaron Chatterjee; Sade Fashokun; Micky Minhas (57) ABSTRACT

Embodiments of the present invention relate to systems, methods, and computer storage media for identifying, authenticating, and authorizing a user to a device. A dynamic image, such as a video captured by a depth camera, is received. The dynamic image provides data from which geometric information of a portion of a user may be identified as well as motion information of a portion of the user may be identified. Consequently, a geometric attribute is identified from the geometric information. A motion attribute may also be identified from the motion information. The geometric attribute is compared to one or more geometric attributes associated with authorized users. Additionally, the motion attribute may be compared to one or more motion attributes associated with the authorized users. A determination may be made that the user is an authorized user. As such the user is authorized to utilize functions of the device.

19 Claims, 5 Drawing Sheets

(56) References Cited

OTHER PUBLICATIONS

Kotsia, et al., "Facial Expression Recognition in Image Sequences using Geometric Deformation Features and Support Vector Machines", In Proceedings of IEEE Transactions on Image Processing, vol. 16, Issue 1, Jan. 2007, 16 pages.

Liao, et al., "Video-based Face Recognition based on View Synthesis from 3D Face Model Reconstructed from a Single Image", In Proceedings of IEEE International Conference on Multimedia and Expo, Apr. 26-Jun. 23, 2008, 4 pages.

Yin, et al., "3D Face Recognition based on High Resolution 3D Face Modeling from Frontal and Profile Views", In Proceedings of the 2003 ACM SIGMM workshop on Biometrics methods and applications, Nov. 8, 2003, 8 pages.

\* cited by examiner

MULTI-FRAME DEPTH IMAGE INFORMATION IDENTIFICATION

BACKGROUND

Authentication of a user to a device has been accomplished using a variety of biometric or user provided inputs. For example, a user may enter a password in to a smart phone to access functionality of the smart phone. However, the mere entry of memorized characters raises potential concerns for an ease of duplication and also a potential for forgetting/losing the specific sequence of characters to be entered.

Biometric authentication provides an alternative means for authenticating a user. However, various biometric authentication technologies are cumbersome to implement on a consumer device as a result of space constraints, cost constraints, and other limitations. Further, false positive and false negative authorizations may frustrate a user as a result of environmental changes (e.g., lighting, humidity, environmental noise) and physical changes of the user (e.g., hair changes, accessories, angle of view).

SUMMARY

Embodiments of the present invention relate to systems, methods, and computer storage media for identifying, authorizing, and/or authenticating a user to a device. A dynamic image, such as a video captured by a depth camera, is received. The dynamic image provides data from which geometric information of a portion of a user may be identified as well as motion information of a portion of the user may be identified. Consequently, a geometric attribute (e.g., size, shape, volume) is identified from the geometric information. A motion attribute (e.g., motion path in three-dimensional space of a point on the user, such as a finger or a part of a mouth) is also identified from the motion information. The geometric attribute is compared to one or more geometric attributes associated with authorized users. Additionally, the motion attribute is compared to one or more motion attributes associated with the authorized users. A determination may be made that the user is an authorized user. As such, the user is authorized to utilize functions of the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for identifying, authorizing, and/or authenticating a user to a device. A dynamic image, such as a multi-frame video captured by a depth camera, is received. The dynamic image provides data from which geometric information of a portion of a user may be identified as well as motion information of a portion of the user may be identified. Consequently, a geometric attribute (e.g., size, shape, volume) is identified from the geometric information. A motion attribute (e.g., motion path in three-dimensional space of a point on the user, such as a finger or a part of a mouth) is also identified from the motion information. The geometric attribute is compared to one or more geometric attributes associated with authorized users. Additionally, the motion attribute is compared to one or more motion attributes associated with the authorized users. A determination may be made that the user is an authorized user. As such, the user is authorized to utilize functions of the device.

Accordingly, in one aspect, the present invention provides a method in a computing environment utilizing a processor and memory for authenticating a user to a device. The method is comprised of receiving a dynamic image. The dynamic image is comprised of geometric information of a portion of the user and motion information of a portion of the user. The method is further comprised of identifying, with the processor, a first attribute from the geometric information and a second attribute from the motion information. The method also is comprised of comparing, with the processor, the first attribute from the geometric information and the second attribute from the motion information to one or more attributes associated with an authorized entity. Additionally, the method is comprised of authorizing the user to utilize one or more functions of the device.

In another aspect, the present invention provides a handheld device for authenticating a user to the handheld device. The handheld device is comprised of a processor, a depth camera, and computer storage media having computer-executable instructions embodied thereon, that when executed by the processor, cause the handheld device to perform a method. The method is comprised of capturing, with the depth camera, a series of images of at least a portion of a head of the user; identifying a first attribute within the series of images; determining the user is an authorized user of the device based, at least in part, on the first attribute; and providing a first functionality of the device to the user in response to determining the user is an authorized user.

A third aspect of the present invention provides computer storage media having computer-executable instructions embodied thereon, that when executed by a computing system having a processor and memory, cause the computing system to perform a method of authorizing a user of a device. The method is comprised of capturing an image sequence of a user with a camera coupled with a device. Each image of the image sequence is comprised of depth information. The method is further comprised of identifying, with the processor, a first facial gesture in three dimensional space captured in the image sequence. Additionally, the method is comprised of identifying, with the processor, a second facial gesture captured in three-dimensional space in the image sequence. The method is further comprised of determining the first facial gesture corresponds with a first authorizing gesture. Additionally, the method is comprised of determining the user is an authorized user of the device. The method is also comprised of authorizing one or more functions of the device for use by the user in response to determining the user is an authorized user.

Having briefly described an overview of embodiments of the present invention, an exemplary operating environment suitable for implementing embodiments hereof is described below.

Figure 1:
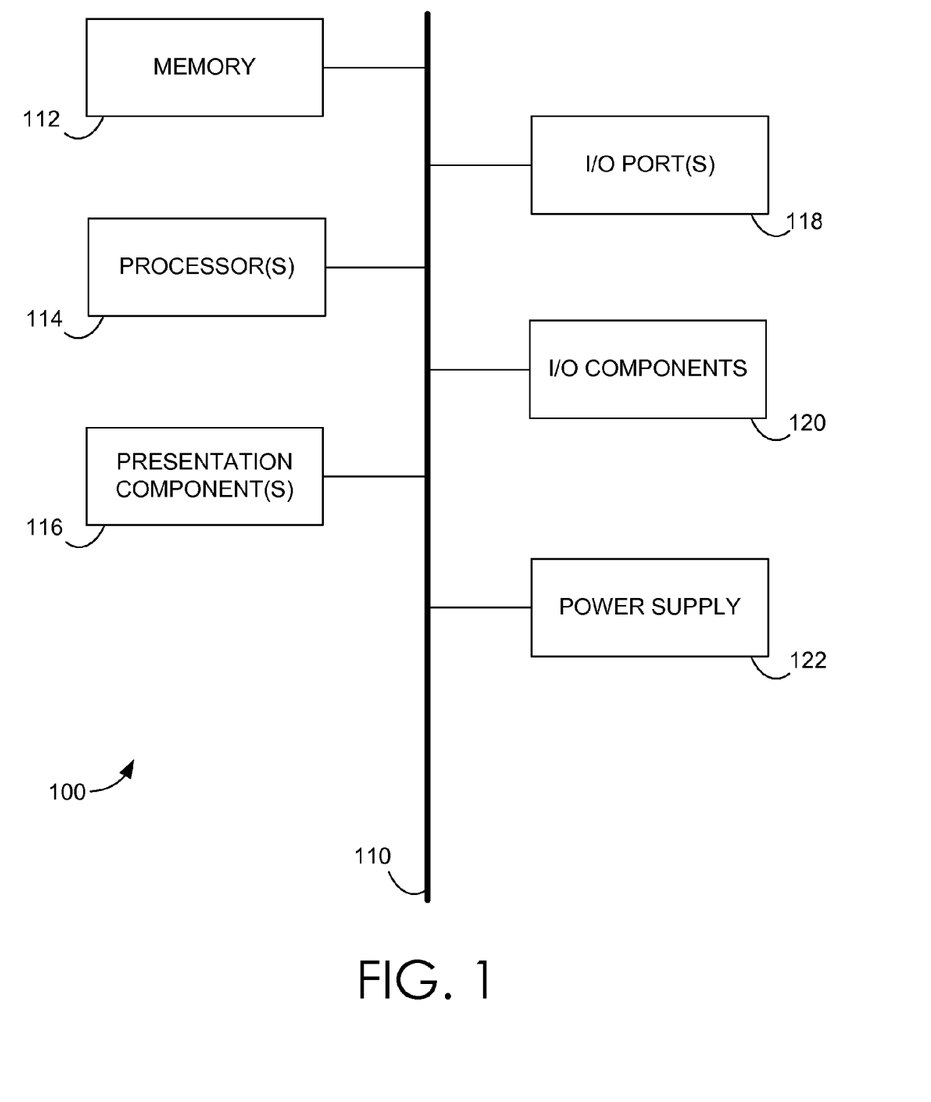
FIG. 1 depicts an exemplary computing device suitable for implementing embodiments of the present invention.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes non-transitory computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in Illustrative modules include a microphone, touch screen, camera, accelerometer, scanner, printer, wireless device, and the like.

Figure 2:
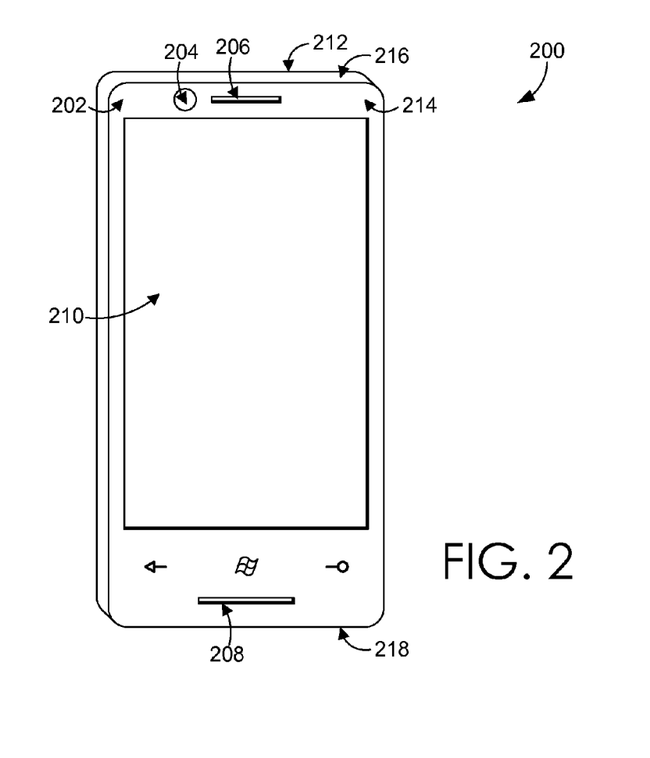
FIG. 2 depicts an exemplary handheld device, in accordance with embodiments of the present invention.

FIG. 2 depicts an exemplary handheld device 200, in accordance with embodiments of the present invention. In particular, the handheld device 200 may provide functionality of a mobile communications device, such as a smart phone. However, it is contemplated that in additional embodiments, a handheld device may include a computing device, a controller, a gaming peripheral, a computing device peripheral, an authentication specific device, a digital camera, and other devices that may be consumer or commercial in use.

The handheld device 200 of FIG. 2 is comprised of a body 202 having a front side 214, a back side 212, a top side, 216, and an opposite bottom side 218. Additionally, the handheld device 200 is further comprised of a camera 204, an audio output device 206 (e.g., speaker), an audio input device 208 (e.g., microphone), and a display 210. It is understood that additional components, devices, and the like may be coupled with (directly or indirectly) the handheld device 200 to accomplish one or more aspects contemplated for the present invention. For example, the handheld device may be further comprised of accelerometers, touch sensors, light sensors, heat sensors, pressure sensors, and the like.

The camera 204, in an exemplary embodiment, is a depth camera. A depth camera is a camera capable of capturing range information. For example, a depth camera may capture a range image that is able to be reproduced as a two-dimensional image showing a range (i.e. distance) to points (e.g., pixels) in a scene from a specific point (e.g., the location of the camera). Therefore, in this example, the resulting image may be referred to as a range image that has pixel values corresponding to a distance. For example, pixel brightness or a pixel color value may be adjusted based on an associated range for each pixel.

A variety of technologies are contemplated to provide a depth camera. For example, but not intended as a limitation, stereo triangulation, sheet of light triangulation, structured light, time-of-flight, inferometry, coded aperture, laser range finding, and the like may be used alone or in any combination to help determine a range for one or more points captured by the camera. In an exemplary embodiment, a technology similar to that utilized in a Kinect, available from Microsoft Corporation of Redmond Wash., may be utilized in the handheld device 200 of FIG. 2. In this example, while a single circular aperture illustrated as the camera 204, it is understood that a variety of apertures, geometries, sizes, and/or locations may be implemented to accomplish aspects of the present invention. For example, implementing a structured light depth mapping technology may utilize a projector that is offset from a receptor to map a range of various points on an object. In this example, the combination of components necessary to capture an image having depth information is referred to generally as a camera or a depth camera. Therefore, it is understood that any combination of a receptors and projectors may be used in any combination to result in a camera for capturing depth information of an object.

The camera 204 (which may be comprised of a plurality of components that are useable in combination to capture a range map of an object), in this example, is forward facing, which allows the camera to capture an image of one or more objects in front of the handheld device 200. It is further contemplated that the camera may be oriented in any orientation and/or located at any location functional for accomplishing aspects of the present invention (e.g., remotely, back facing). Further, it is contemplated that one or more components of the handheld device 200 may be combined. For example, the display 210 may be functionally adapted to capture an image. The display 210 may incorporate The Wedge available from the Microsoft Corporation of Redmond Wash., which utilizes a refractive surface to sense an object that is exposed to the front surface, such that the object is sensed by a sensor along an edge of the refractive surface. Further, it is contemplated that the refractive surface may also be utilized as a projector for use in one or more depth mapping technologies.

The camera 204 is contemplated as being able to capture both human visible light spectrum (e.g., electromagnetic radiation in the wavelength range of 400-790 THz) and non-human visible light spectrum (e.g., infrared light in the electromagnetic radiation wavelength range of 1-400 THz). Therefore, the camera, a previously discussed, may be able to capture thermal light and/or visible light, for example.

While various components are illustrated in a particular arrangement on the handheld device 200, it is contemplated that one or more of the components may be located or arranged in any relationship. For example, the camera 204 is depicted in close vicinity to the audio output device 206. In this example, the camera 204 is suitable to provide a three-dimensional image of the user's ear (e.g., pinna) as the handheld device 200 approaches the ear for in-phone-use. It is similarly contemplated that the camera 204 and the audio output may be separated to allow the camera 204 to remain functional in an in-phone-use orientation of the handheld device 200.

Further, as previously discussed, the handheld device 200 illustrated in FIG. 2 is merely exemplary in nature. Additional embodiments are contemplated that are handheld and/or static. For example, aspects of the present invention may be performed in connection with a desktop, a laptop, a tablet, and other computing devices. Further yet, it is contemplated that one or more device may be used in conjunction. For example, one or more components of a first device (e.g., camera) may be used in conjunction with one or more components of another device (e.g., display). In this example, it is contemplated that a camera of a first device may capture a series of gestures and physical characteristics of a user using a second device. In response to the capturing of gestures and characteristics by the first device, the user is authorized to one or more functions of the second device, for example.

Figure 3:
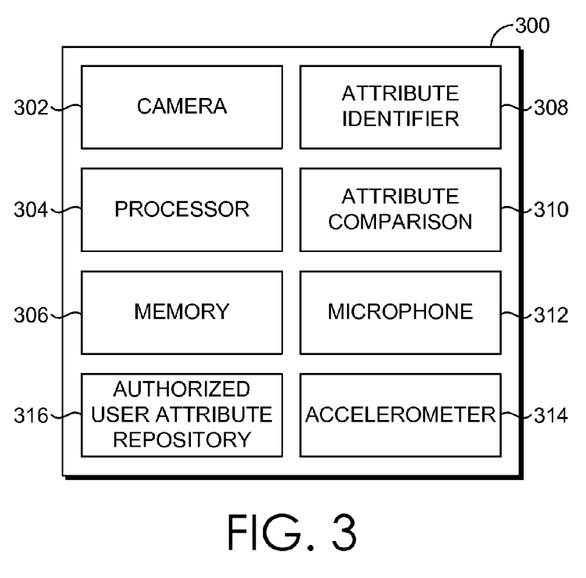
FIG. 3 depicts a block diagram illustrating an exemplary system in which embodiments of the present invention may be employed.

FIG. 3 depicts a block diagram illustrating an exemplary system 300 in which embodiments of the present invention may be employed. It should be understood that this and other arrangements described herein are set forth only as examples. Other arrangements and elements (e.g., machines, interfaces, functions, components, devices, and grouping of components, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 300 may include a camera 302, a processor 304, a memory 306, an attribute identifier 308, an attribute comparison 310, a microphone 312, an accelerometer 314, and an authorized user attribute repository 316. Each of the listed components or services may be used alone or in combination to accomplish one or more functions contemplated with the present invention. Further, it is contemplated that the attribute identifier 308 and the attribute comparison 310 may be implemented in software, hardware, or a combination. Further, it is contemplated that the attribute identifier 308 and/or the attribute comparison 310 may utilize one or more components (e.g., the processor 304, the memory 306).

The camera 302, as previously discussed with the camera 204 of FIG. 2, may include any type of image capturing technology. In an exemplary embodiment, the camera 302 is a depth camera, a camera capable of capturing range information for one or more points of an object.

It is contemplated that the camera 302 is functional to capture a series of frames (i.e., unique images) per second to form a resulting dynamic image of a moving object. For example, a video is a series of images that are capable of capturing height and width information as well as motion information. When a depth camera is used to capture a video (e.g., dynamic image) of an object, depth information is also captured over time. Therefore, it is contemplated that a depth camera is capable of capturing a dynamic image that portrays geometric dimensional information and motion information. The motion information may be a velocity (or acceleration) of an object in one or more directions (e.g., left to right, up to down, front to back, and any combination thereof).

Geometric information in a three-dimensional space may include a variety of attributes, such as size, orientation, and distances of one or more objects, points, shapes, and other defined volumes. For example, an attribute of geometric information related to a human head may include determining a size, a volume, an orientation, a relative separation from other points/objects, and the like for a particular portion of the head. Examples of portions of the head may include, but are not limited to, eye, ear, mouth, nose, chin, brow, teeth, hair, bone structure, cheeks, and the like. Additionally, it is contemplated that any portion of the user may be captured (e.g., hand, head, torso, eye, mouth, ear, legs, and feet).

Further, it is contemplated that any one of the discrete portions may be further refined into a finer level of granularity. For example, an attribute on geometric information may be identified for a pinna in general, or for particular portions such as the Fossa Triangularis, the Cymba Conchae, the Crus Helix, the Cavum Conchae, the Crura of Antihelix, Scaphoid Fossa, the Helix, the Antihelix, and/or the Antiragus. In this example, an attribute (e.g., size, shape, volume, separation, depth discrepancy) may be based on one or more portions of the pinna. Similarly, the attributes of a mouth of a user may be further identified from an upper lip, a lower lip, teeth (individually or particular teeth), and/or tongue. Further, an attribute identified related to an eye may actually be identified from an iris, a pupil, scalar, an eyelid, eyelashes, and any combination of those portions. Similarly, an attribute identified from a nose may be identified from a glabella, a bridge, an ala, an apex, a septum, and/or a nostril. It can be appreciated (and as will be discussed hereinafter) that utilizing a depth image to allow for additional attribute information not provided by a traditional two-dimensional imaging camera provides additional, unrealized, elements to aid in aspects of the present invention. While exemplary portions of one or more features of a human head are provided, it is understood that additional portions may be utilized in aspects of the present invention.

Motion information that may be captured in a dynamic image may include, but is not limited to, one or more points on an observed object as it transitions from a first point at a first time to a second point at a second time. For example, a user's pupil may provide a point, that when tracked over time, provides an indication of movement of an eye. Motion may also be captured through a transition of a particular geometry from a first state to a second state.

Together, geometric information and motion information may provide tools for identifying a particular gesture performed by a particular user. For example, geometric information may be utilized to identify a particular person through facial recognition techniques. The motion information (in possible conjunction of geometric information) allows for a predefined gesture, sequence of gestures, and/or various speeds of gesture(s) to occur in three-dimensional space. Therefore, it is contemplated that a device is able to reduce a number of false positive authorizations through a paired analysis of geometric information and motion information.

The attribute identifier 308 identifies an attribute from a dynamic image. For example, the attribute identifier 308 may identify a landmark or feature of a portion of a user captured in the dynamic image. Additionally, it is contemplated that the attribute identifier 308 may identify a relative position, size, and or shape of one or more features of a user captured in the dynamic image.

Further, it is contemplated that the attribute identifier 308 may identify a motion attribute. For example, a motion attribute may describe how a particular feature, point, or other object moves through space in time and/or displacement. For example, a point on a user's lip may be selected and a motion attribute is a description of how the lip moves through space over time as captured by a camera. Therefore, it is contemplated that the attribute identifier 308 may identify an attribute useable for describing a path in space taken by a particular object. This identified motion attribute may be useable for defining a gesture, at least in part.

The attribute comparison 310 compares one or more identified attributes to one or more attributes of authorized users, such as those maintained in the authorized user attribute repository 316. The attribute comparison may compare a particular attribute with that of a similar attribute. For example, an attribute may include a distance between pupils of a user, which may be compared to known distances between pupils for authorized users. Further, the attribute comparison 310 may compare a motion attribute as identified in a dynamic image to one or more motion attributes associated with an authorized entity. For example, a particular sequence of gestures (e.g., combination of motions) in three-dimensional space of an authorized user may be maintained in the authorized user attribute repository 316, such that identified motion attributes describing a gesture of a user as captured in a dynamic image may be compared to those motion attributes of the authorized user to ultimately authorize a user. Stated differently, a geometric attribute (e.g., facial feature) and a motion attribute (e.g., gesture by a user) may be compared with corresponding attributes to determine if a particular user is an authorized user.

The microphone 312 is an audio input device functional for receiving audio input. In an exemplary embodiment, the microphone 312 may be useable to further provide an input that may be utilized to authorize a user. For example, a user may speak a series of sounds that, in combination with the motion attributes and geometric attributes, are useable for authorizing the user. Additionally, the microphone 312 may be functional to directionally identify a source of a gesture. For example, a directional microphone may be useable to identify a particular user from a group of users based on an inference of the location of the user as determined by sound received by the microphone.

The accelerometer 314 is functional to detect acceleration (e.g., gravitational force, movement of the device). Information from the accelerometer 314 may be used in conjunction with information (e.g., a dynamic image) received from the camera 302 to authenticate a user. For example, the accelerometer 314 may detect movement of a handheld device, which is interpreted as the device moving from a first position to a second position, such as a phone-in-use orientation. This movement of the device may trigger the camera 302 to capture a dynamic image of a user's ear as the device approaches. Consequently, based on a particular motion of the user as they move the phone (captured as a motion attribute) and a geometric attribute of the user's ear, a determination may be made that the user is an authorized user. For example, a user may shake the device (or any other motion able to be captured with motion sensors) to initiate the capturing of multi-frame depth image information (e.g., depth video of a portion of the user).

While discussions herein generally provide a single motion attribute and/or a single geometric attribute, it is understood that a plurality of motion attributes and/or a plurality of geometric attributes may be utilized when authorizing a user.

The various components of the system 300 may communicate with each other via a network, which may include, without limitation, one or more local area networks (LANs) and/or wide area networks (WANs). Such networking environments are commonplace in offices, enterprise-wide computer networks, intranets, and the Internet.

Figure 4:
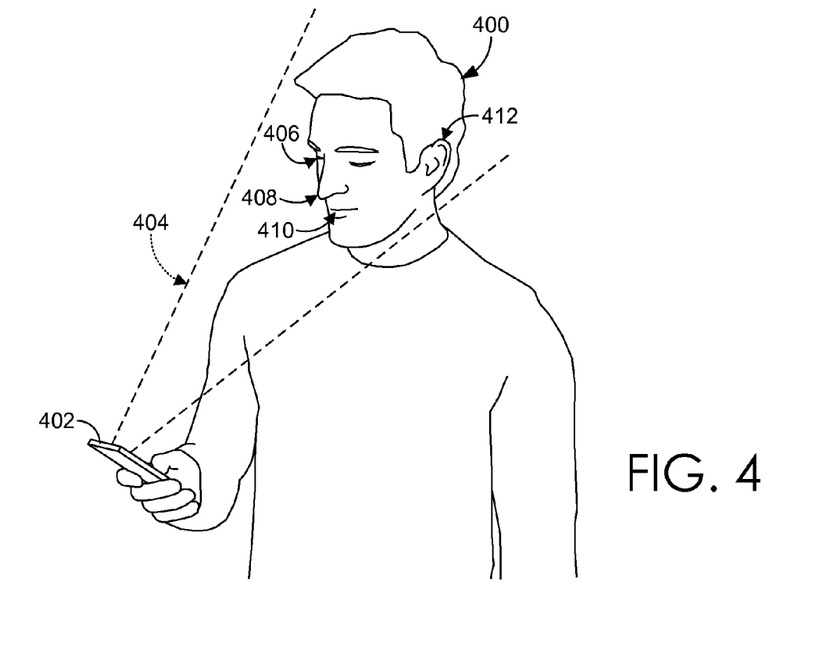
FIG. 4 depicts an exemplary authorizing orientation of a device and a user, in accordance with aspects of the present invention.

FIG. 4 depicts an exemplary authorizing orientation of a device 402 and a user 400, in accordance with aspects of the present invention. The device 402 may be a handheld device as depicted, but is also contemplated that the device 402 may also be mounted to a fixture, a wall, or other surfaces in additional aspects. As depicted, the user 400 is holding the device 402 at an appropriate distance for traditional use of the device 402. When at this distance, a camera of the device 402 may be adapted to capture a field of view 404 that is appropriate for capturing a desired portion of the user 400.

For example, it is contemplated that a portion of the user 400 to be captured by a dynamic image may include portions of the user's head. The field of view 404 may be effective to capture a mouth 410, a nose 408, an eye 406, and an ear 412 of the user 400. Therefore, a resulting dynamic image may include geometric attributes for one or more of those portions of the user. Additionally, motion attributes within the field of view 404 may also be identified. For example, movement of the mouth 410, such as a non-verbal mimicking of speech may be performed by the user 400 as a form of a gesture. Additionally, a series of movements of the eye 406 may also be captured as a motion attribute. Further, a combination of portions may be moved to form one or more gestures. For example, a user may manipulate various muscles within the face to form a sequence of smiling and frowning that affects a variety of features (e.g., change geometric attributes of the mouth, the eyes, and the cheeks).

In use, it is contemplated that a dynamic image is captured of the user 400, which allows for a facial recognition utilizing three-dimensional input. In addition to capturing information useable for a facial recognition-type process, it is contemplated that the dynamic aspect of the dynamic image provides motion information that is useable for identifying unique muscular-skeletal interactions of the user. Further, the dynamic image provides motion information that is useable for identifying one or more gestures performed by the user. For example, it is contemplated that a user performs a series of gestures that are captured in three-dimensional space. The sequence of gestures may be a predefined sequence that is useable by the user to access one or more functions of a device. Further, because a three-dimensional image (including depth information) is utilized in this example, replicating the gesture by a different entity is substantially more difficult. Therefore, three-dimensional image information may be useable for authenticating a user based on both three-dimensional geometric characteristics of one or more features, but also by motion of one or more portions of the user.

Further, it is contemplated that the one or more gestures may not be limited to movement of a feature captured by a camera, but instead may include a gesture including the hand/arm of the user that is holding the device 402. For example, a trombone-type movement of the hand may move the device 402 at various locations in and out relative to the user 400, which a traditional two-dimensional camera would not capture effectively. But, utilizing a three-dimensional camera allows for the depth information to provide an indication as to a distance between the device 402 and one or more features of the user 400. Consequently, an observer standing in a line extending behind the device 402 from the user 400 may only observe that the sequence of gestures involves in and out movement of the device 402 relative to the user 400, but the observer would be unable to mimic the distances (depth information) to recreate the series of gestures. While linear motions (e.g., trombone-type motion) are discussed, it is contemplated that any type of motion (e.g., direction, orientation, velocity, acceleration) in three-dimensional space may be utilized as a gesture (either on the device 402 and/or a portion of the user 400).

Figure 5:
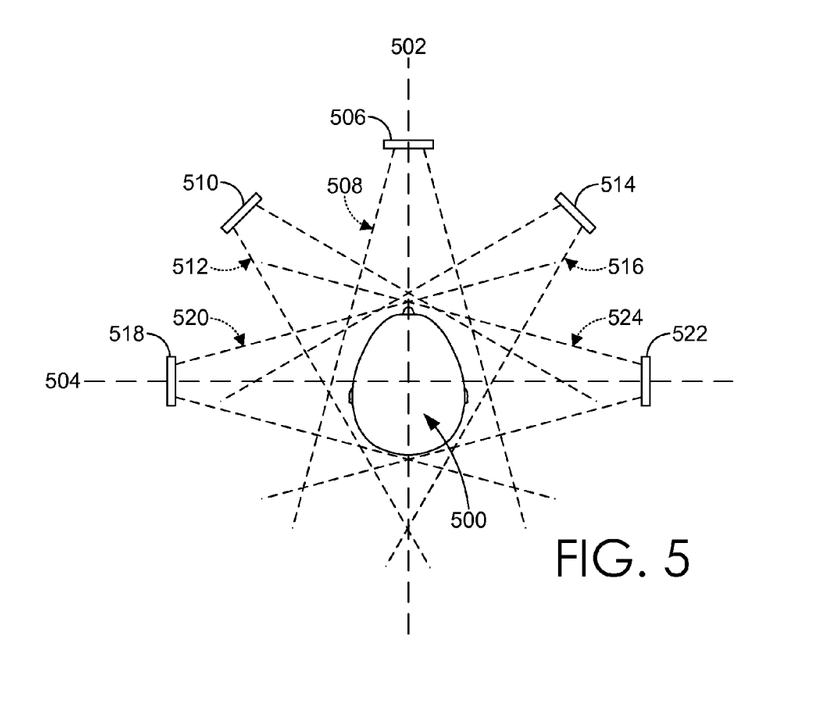
FIG. 5 depicts a top-down perspective of a user with a plurality of field of views from which a device may capture a dynamic image, in accordance with aspects of the present invention.

FIG. 5 depicts a top-down perspective of a user 500 with a plurality of field of views from which a device may capture a dynamic image, in accordance with aspects of the present invention. Exemplary axes are depicted, such as a z-axis 502 and an x-axis 504. A y-axis, which is not depicted, may extend into the figure through an intersection of the z-axis 502 and the x-axis 504. While the plurality of devices are depicted at an approximate equidistance (e.g., depth) from the user 500, it is understood that a device may be moved in any direction at any orientation of any axis in three-dimensional space. An advantage of utilizing a depth camera is the ability to capture a dynamic image from a variety of locations to evaluate a common feature. For example, a traditional two-dimensional image may not be effective for capturing a useable facial recognition image if the captured image is not oriented within a few degrees of a source image. However, inclusion of depth information allows geometric attributes to be identified from a variety of angles. Similarly, motion attributes may be identified from a variety of angles.

A location 506 is substantially aligned with the z-axis 502 and provides a field of view 508. A location 510 is offset between the z-axis 502 and the x-axis 504 and is functional to capture a field of view 512. A location 514 is also offset between the z-axis 502 and the x-axis 504 and is functional to capture a field of view 516. A location 518 is substantially aligned with the x-axis 504 and is functional to capture a field of view 520. A location 522 is substantially aligned with the x-axis 504 and is functional to capture a field of view 524.

Traditionally, a device is positioned at the location 506 to capture a two-dimensional image of the user 500 for authentication purposes; however, if the device was positioned closer to location 510 or 514, the resulting captured image may not be useable for authentication purposes. A depth camera may, however, be able to capture a dynamic image from locations 510 or 514 and still perform an authentication process as a result of the included depth information.

Captured multi-frame depth image information may be useable for identifying a particular user, for authorizing the particular user, and/or for authenticating the particular user. For example, functions of the device may be limited for use to only those users that are authorized. Further it is contemplated that in order to determine a user is authorized, the user must first be identified. Identification of the user may be accomplished, at least in part, utilizing multi-framed depth image information captured by the device, as discussed herein. Further, it is contemplated that the identification of a user may be accomplished through the authentication of one or more features of the user as captured by depth image information relative to known features of the user. Therefore, as discussed with respect to FIG. 6 hereinafter, a user may be identified, authorized, and/or authenticated utilizing multi-frame depth image information.

Figure 6:
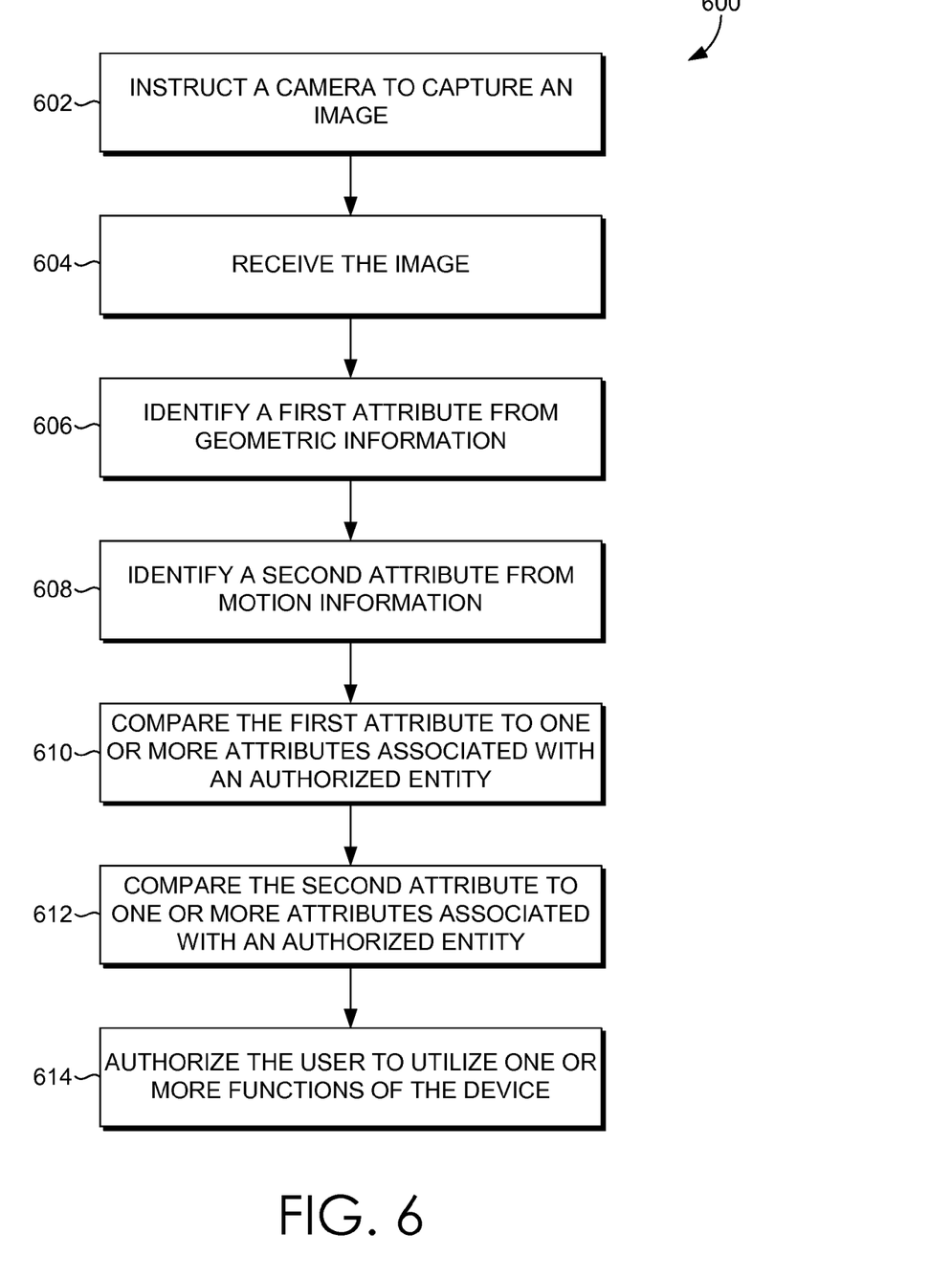
FIG. 6 depicts a block diagram of a method for authenticating a user to a device, in accordance with aspects of the present invention.

FIG. 6 depicts a block diagram of a method 600 for identifying, authorizing, and/or authenticating a user to a device, in accordance with aspects of the present invention. At a block 602 an instruction is communicated to a camera to capture an image. The instruction may be generated by a program operating in a device. For example, a smart phone may require an authentication as a result of a user trying to access one or more functions (e.g., check email, make a call). In response to the user trying to access the function, the device may initiate an authentication routine that includes capturing a dynamic image utilizing a depth camera. Further it is contemplated that a User Interface ("UI") is updated on a display of the device to instruct the user to position the device in a predefined manner. Further, it is contemplated that the UI may instruct the user to begin performing a series of gestures to be captured by the camera. Therefore, it is contemplated that a program of the device provides an instruction to the camera to capture an image. Additional embodiments contemplate the user causing the camera to capture the image. Further yet, it is contemplated that a third party (e.g., security personal) may cause the camera to capture the image.

At a block 604, an image, such as a dynamic depth image, is received from the camera. The image may be received at memory of the device. Further, it is contemplated that the image may be received from a remote camera that is not physically coupled with the device. The image may be comprised of geometric information, such as data allowing for a calculation of size, shape, volume, distance, and the like. Additionally, it is contemplated that the image is comprised of motion information. Motion information may be inferred from a series of frames that make up the dynamic image. For example, calculating a distance a defined point moves from within a first frame to a position within a second frame is useable to define a vector having a direction and speed of the point. Evaluating several subsequent vectors for the same point allows for a mapping of a motion path, such as a defined three dimensional path that is formed by a predefined gesture. Additionally, it is contemplated that additional data may be used to further distinguish between movements of the camera from movements of a feature. For example, accelerometer information and/or analysis of background imagery captured in the dynamic image.

At a block 606, a first attribute is identified from the geometric information. For example, as previously discussed, the geometric attribute may be a size, shape, orientation, volume, and/or other physical characteristic of the geometry of a particular landmark/feature of the user. For example, the attribute identifier 308 of FIG. 3 may identify a shape of a user's eyes, a shape of the user's nose, and/or a shape of the user's mouth from the geometric information.

At a block 608, a second attribute is identified from the motion information. For example, movement of one or more features of a user's face may be identified to observe a sequence of gestures performed by the user. In an exemplary embodiment, the user may mimic stating a word, which is captured by the dynamic image. Motion of the user's mouth, cheeks, and/or eyes may be identified while mimicking saying the word(s). The captured motion, which may be done with a depth camera, may be unique to the user such that even if another user attempts to gain authorization by stating the same phrase, their muscular-skeletal motion may not match that of the authorized user.

At a block 610, the first attribute is compared to one or more attributes associated with an authorized entity. For example, if the attribute identified is a distance between two landmarks of the user (e.g., distance between two pupils), that distance may be compared to a known distance between similar landmarks of one or more authorized users. Because of variations in lights, calibration, field of view, and the like, a comparison may result in an affirmative match when a predefined confidence value is achieved. For example, if the first attribute is within a statistical margin of an authorized user's first attribute, a match may be declared. The level of confidence may be adjusted based on a level of tolerable false negatives and tolerable false positives. This comparison may be a form of authentication, which authenticates the user as captured by one or more images with known information of an authorized user.

At a block 612, the second attribute is compared to one or more attributes associated with an authorized entity. For example, if the motion attribute is a three-dimensional motion path of a feature of the user, that motion path (e.g., path traveled in space by the feature) may then be compared with a motion pathway associated with a pathway of an authorized user. Similar to the geometric attribute, a level of confidence may be utilized for adjusting a false positive and a false negative results. If the second attribute is determined to be a match, the user may be authorized to access one or more functions of the device, as indicated at a block 614.

Further, it is contemplated that a user must be determined to match both a geometric attribute and a motion attribute of the same authorized user profile. For example, a user must not only have one or more matching geometric features (e.g., similar facial structures), but they must also provide an associated motion attribute (e.g., sequence of gestures) as is associated with the particular features (or other features).

The process of comparing attributes may initially provide for the identification of the user. Once the user is identified, the user may be authorized by authenticating the user. Further, it is contemplated that identification of the user may also allow for one or more changes to a device. For example, an identified user may have preferences that are applied to the device (e.g., language, volume, brightness, settings, functions, and the like) once the user is idenitfied. Therefore, it is contemplated that functions, steps, methods, components, and devices discussed herein are applicable for identifying a user, authenticating a user and/or authorizing a used.

While not depicted as part of the method 600, it is also contemplated that a training program may be implemented. The training program may provide one or more attributes (e.g., geometric, motion) that are associate with an authorized user. Similar to creating a password, a user may provide a sequence of gestures that are captured with the device and stored in authorized user attribute repository 316 of FIG. 3. Additionally, it is contemplated that in addition to capturing motion attributes, the camera may also simultaneously capture geometric attributes that may also be associated with the authorized user.

Figure 7:
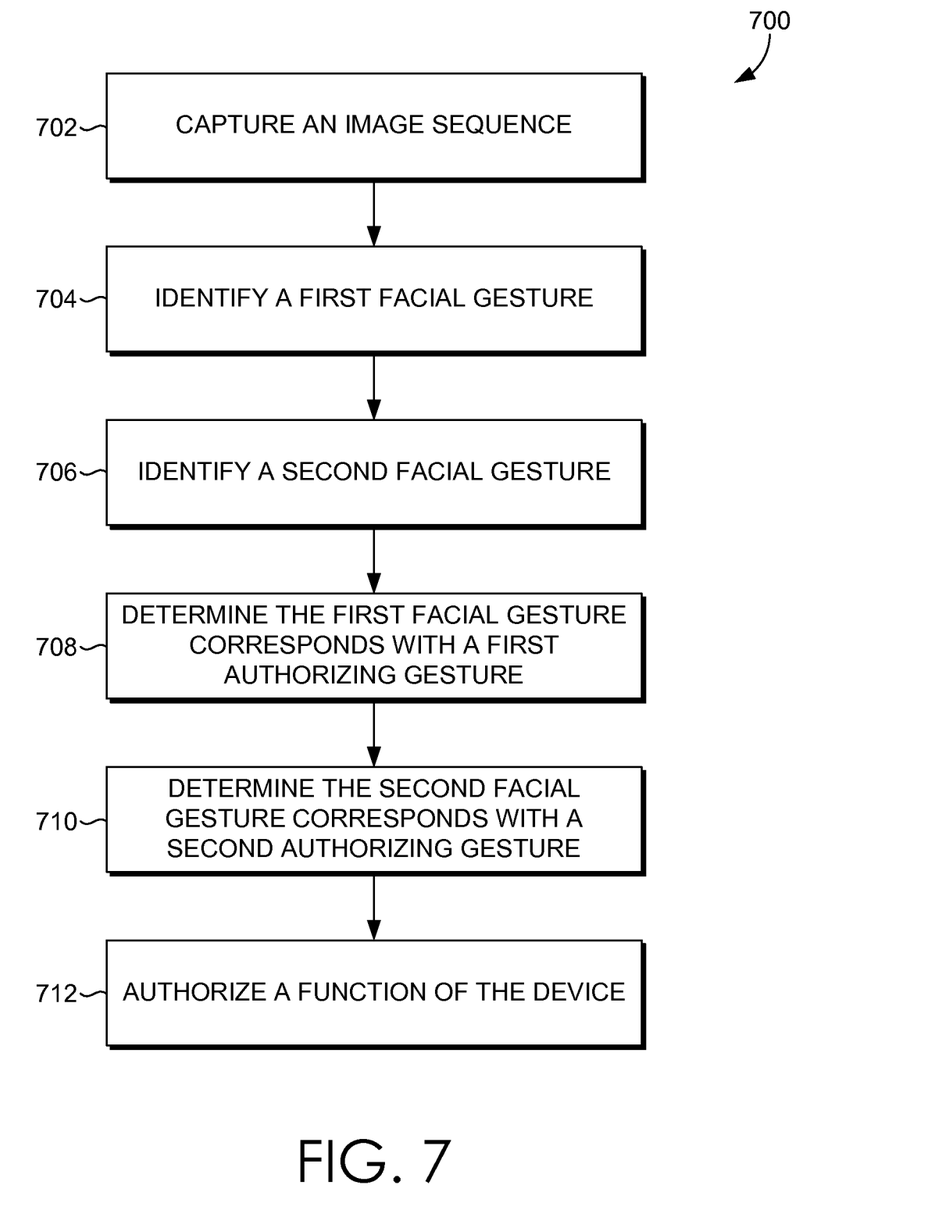
FIG. 7 depicts another block diagram of a method for authenticating a user to a device, in accordance with aspects of the present invention.

FIG. 7 depicts a block diagram of a method 700 for authenticating a user to a device, in accordance with aspects of the present invention. At a block 702 an image sequence is captured. The image sequence (e.g., a dynamic image) may be a video comprised of two or more frames. Each of the frames may be comprised of depth information useable to generate at least a partial three-dimensional representation of an object captured by the camera.

At a block 704, a first facial gesture may be identified. For example, a user may make a first movement of one or more features (e.g., eyes, ears, nose, moth, brow, cheeks). The first movement may be simple in nature (e.g., blinking of an eye) or complex in nature, such as simultaneously closing one eye while moving a tongue to an outer portion of the mouth. A second gesture may also be identified from the image sequence, as depicted at the block 706. The second gesture may merely be the reverse of the first gesture and/or it may be a completely independent movement of a different (or same) feature from the first gesture. In combination, the first gesture and the second gesture may form a series of gestures (e.g., speaking a phrase).

At a block 708, a determination is made that the first gesture corresponds with a first authorized gesture. Similarly, at a block 710, a determination is made that the second gesture corresponds with a second authorized gesture. In real time, the first gesture and the second gesture may appear as a continuous movement. Therefore, the order in which the gestures occur may be a necessary requirement for determining they correspond. For example, if an authorized series of gestures consists of a smile then a frown; if a user frowns then smiles, the order does not correspond even though the particular expressions do. Further, a temporal aspect may be evaluated such that a period of time that each gesture is maintained or performed may be another aspect evaluated in the determination. Further, it is contemplated that other motion attributes may also be taken into consideration (e.g., velocity, acceleration).

At a block 712, a function of the device is authorized for the user. For example, a user may be able to access information, access a UI, access a program (e.g., application), or otherwise utilize the device. The authorization, in this example, is in response to the determinations that the first gesture and the second gesture corresponds with authorized gestures.

It is contemplated that aspects of the present invention may be applied in a variety of setting and environments. For example, as opposed to entering a personal identification number (PIN) at an ATM or other service, embodiments of the present invention may provide the appropriate authentication. Further, it is contemplated that voting authentication, border crossing, and other general security points may implement one or more embodiments of the present invention to serve as an additional or an alternative authentication tool. Further yet, it is contemplated that a computing device may adapt to accommodate a detected authorized person (e.g., apply preferred setting in the computing device based on the particular user that is identified). Additional implementations of embodiments provided herein are contemplated and within the scope of the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method in a computing environment utilizing a processor and memory for authenticating a user to a device, the method comprising:
   capturing with a depth camera on the device, a first dynamic depth image comprised of geometric information and motion information of a portion of the user from a plurality of angles, the geometric information useable to generate at least a partial three-dimensional representation of the portion of the user;
   storing the captured first dynamic depth image in an authorized user attribute repository as an authorized entity;
   identifying, with the processor, a first attribute from the geometric information and a second attribute from the motion information;
   subsequently, detecting an acceleration of the device from a first position to a second position, by an accelerometer on the device;
   upon detection of the acceleration of the device, the accelerometer triggering the depth camera to capture a second dynamic depth image;
   receiving at the device, the second dynamic depth image of the portion of the user captured at an angle within the plurality of angles, the second dynamic depth image also comprised of geometric information of the portion of the user and motion information of the portion of the user;
   identifying, with the processor, the first attribute from the geometric information and the second attribute from the motion information of the second dynamic depth image;
   comparing, with the processor, the first attribute from the geometric information and the second attribute from the motion information of the second dynamic depth image to one or more attributes associated with the authorized entity; and
   when the first attribute and the second attribute of the second dynamic depth image are matched to the authorized entity, authorizing the user to utilize one or more functions of the device.

2. The method of claim 1 further comprising instructing a camera to capture the first and second dynamic depth images.

3. The method of claim 1, wherein the camera is functional to capture the first and second dynamic depth images utilizing a human visible light spectrum, a human non-visible light spectrum, or a combination of a human visible light spectrum and a human non-visible light spectrum.

4. The method of claim 1, wherein the first and second dynamic depth images are videos comprised of two or more frames.

5. The method of claim 1, wherein the first and second dynamic depth images are comprised of depth information captured by a depth camera.

6. The method of claim 1, wherein the portion of the user comprises at least one selected from the following:
   a hand of the user;
   a head of the user;
   a torso of the user;
   an eye of the user;
   a mouth of the user; and
   an ear of the user.

7. The method of claim 1, wherein the first attribute represents a size of one or more features captured in the first and second dynamic depth images.

8. The method of claim 1, wherein the motion information is inferred from a change in position of a point on the user from a first frame to a second frame of the first and second dynamic depth images.

9. The method of claim 1, wherein the comparing of the first attribute and the second attribute is further comprised of determining the first attribute and the second attribute are individually comparable to attributes associated with an authorized entity within a predefined confidence level.

10. A handheld device for authenticating a user to the handheld device, the system comprising:
    a processor;
    an accelerometer;
    a depth camera; and
    computer storage media having computer-executable instructions embodied thereon, that when executed by the processor, cause the handheld device to perform a method, the method comprising:
    (1) capturing, with the depth camera, a series of images for a multi-frame depth image of at least a portion of a head of the user;
    (2) identifying a first attribute to be identified from a variety of angles within the series of images;
    (3) detecting an acceleration of the device from a first position to a second position;
    (4) upon detection of the acceleration of the device, triggering the depth camera to capture an authentication dynamic depth image;
    (5) comparing, with the processor, the first attribute identified from the variety of angles within the series of images with the authentication dynamic depth image; and
    (6) determining the user is an authorized user of the device based, at least in part, on the first attribute; and
    (7) providing a first functionality of the device to the user in response to determining the user is an authorized user.

11. The handheld device of claim 10 further comprising a microphone.

12. The handheld device of claim 10, wherein the method further comprising:
    capturing, with the microphone, a verbal input;
    identifying a second attribute within the verbal input; and determining the user is an authorized user of the device based, at least in part on the second input.

13. The handheld device of claim 10, wherein the series of image is comprised of a representation of a mouth of the user as the user mimics speaking one or more words.

14. The handheld device of claim 10, wherein the series of images is comprised of an ear of the user as the handheld device approaches the ear.

15. The handheld device of claim 10, wherein the series of images is comprised of a predefined sequence of facial expressions performed by the user.

16. The handheld device of claim 10, wherein the first attribute is a motion path of a point on the user as captured in the series of images.

17. The handheld device of claim 10, wherein the first attribute is a depth differential between a first point and a second point on the user as captured in the series of images.

18. The handheld device of claim 10, wherein the first attribute is a change in a depth of a point on the user as captured in the series of images.

19. One or more computer storage media devices having computer-executable instructions embodied thereon, that when executed by a computing system having a processor and memory, cause the computing system to perform a method of authenticating a user of a device, the method comprising:
- detecting an acceleration of a first device from a first position to a second position, by an accelerometer on the device;
- in response to the acceleration of the first device, capturing an image sequence, from a plurality of angles, of a user with a camera coupled with the first device, wherein each image of the image sequence is comprised of depth information;
- identifying, with the processor, a first facial gesture in three dimensional space captured in the image sequence;
- identifying, with the processor, a second facial gesture captured in three dimensional space in the image sequence;
- determining the first facial gesture corresponds with a first authorizing gesture; and
- determining, with the processor, the user is an authorized user of a second device.

* * * * *